United States Patent [19]
Schiess

[11] Patent Number: 5,980,180
[45] Date of Patent: Nov. 9, 1999

[54] TWO-PART FASTENER COMPRISING A CLIP HAVING A SPLIT COLLAR ENGAGABLE WITH A FASTENER POST

[76] Inventor: Jennifer E. Schiess, 728 Medford Dr., Rockford, Ill.

[21] Appl. No.: 09/159,666

[22] Filed: Sep. 24, 1998

[51] Int. Cl.⁶ .............. F16B 21/00; F16B 21/18
[52] U.S. Cl. .............. 411/522; 411/339; 411/512; 411/908
[58] Field of Search .................. 411/338, 339, 411/433, 512, 517, 522, 908

[56] References Cited

U.S. PATENT DOCUMENTS

| | | | |
|---|---|---|---|
| 2,118,361 | 5/1938 | Schaeffer, Jr. | 411/433 |
| 2,209,495 | 7/1940 | Scholfield | 411/433 |
| 4,369,012 | 1/1983 | Bailet et al. | 411/433 |
| 4,618,300 | 10/1986 | Goebel | 411/433 |
| 4,859,129 | 8/1989 | Kraus | 411/512 |
| 5,113,553 | 5/1992 | Hutchinson | 24/108 |
| 5,423,858 | 6/1995 | Bolanos et al. | 411/517 X |
| 5,775,863 | 7/1998 | Anderson | 411/512 |

FOREIGN PATENT DOCUMENTS

| | | | |
|---|---|---|---|
| 72788 | 11/1947 | Norway | 411/339 |
| 2 249 804 | 5/1992 | United Kingdom | 411/433 |

*Primary Examiner*—Neill Wilson

[57] ABSTRACT

A fastener includes an elongated shank equipped with longitudinally spaced ribs, and a clip having opposing collar sections connected for movement between first and second positions for engagement with the shank and for installation or removal of the clip from the shank, respectively. Internal tabs formed on the clip aid in maintaining engagement between the collar sections and the shank during application of external twisting forces on the clip.

18 Claims, 5 Drawing Sheets

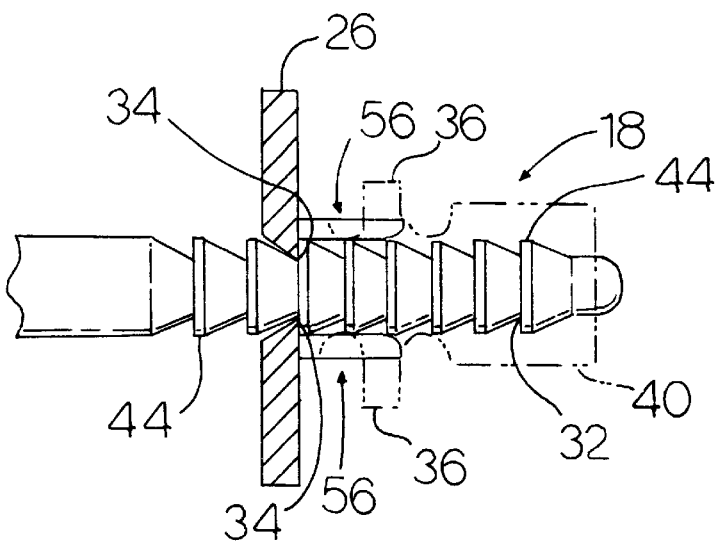
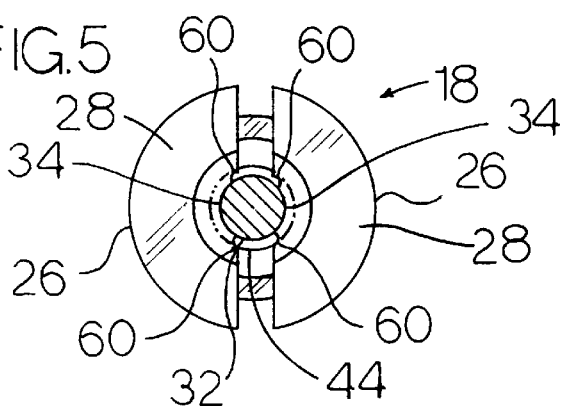
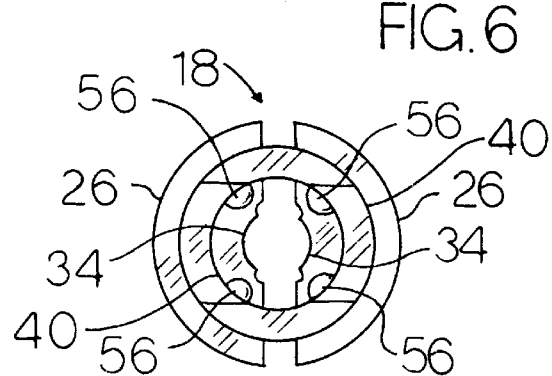
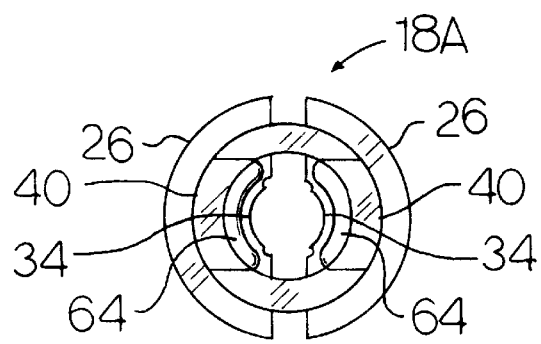

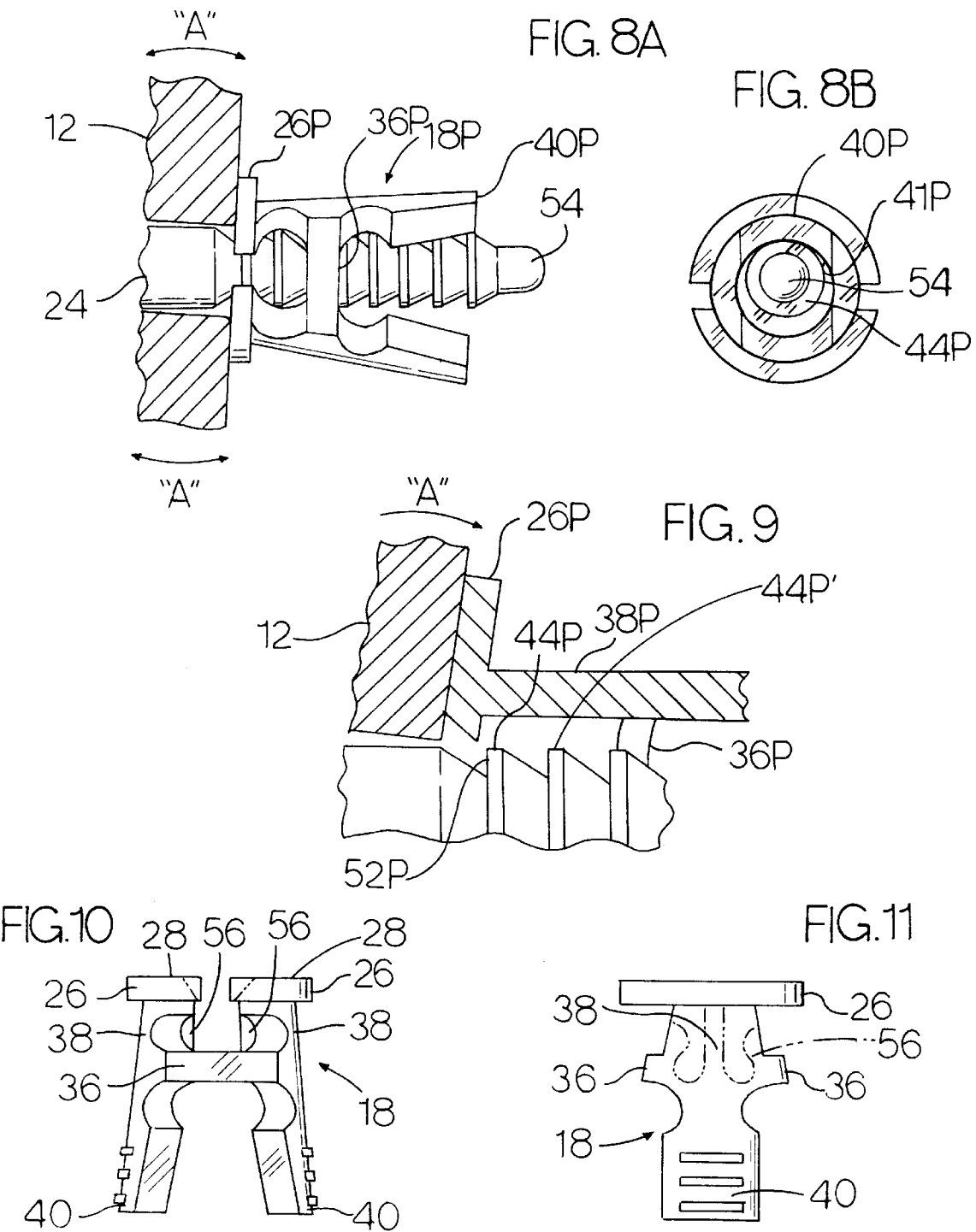

TWO-PART FASTENER COMPRISING A CLIP HAVING A SPLIT COLLAR ENGAGABLE WITH A FASTENER POST

BACKGROUND OF THE INVENTION

The present invention relates generally to two-part fasteners, and more particularly to fasteners adapted for relatively quick assembly by pressing the fastener together.

Numerous fasteners of this general type are known and commercially available. Such fasteners are disclosed in Bailet et al., U.S. Pat. No. 4,369,012; Hutchinson, U.S. Pat. No. 5,113,553; Schaeffer, U.S. Pat. No. 2,118,361; U.K. Pat. No. Application 2249804; Anderson, U.S. Pat. No. 5,775,863 and Norway Pat. No. 72788.

In particular, Anderson discloses a fastener with a clip that includes forward split collar sections movable between a normally closed position for interlocking engagement with longitudinally spaced ribs on a post, and an open position for installation and removal of the clip from the post. Centrally located elastic bands join the collar sections, and a pair of wings extend rearwardly from the elastic bands such that squeezing the wings together opens the collar. The split collar and ribs are provided with complimentary angled surfaces such that the normally closed collar sections snap over the ribs if the clip is pushed onto the post without squeezing the wings together.

Arrangements of varying similarity are shown in the above-mentioned patents. Although the terminology is different, Schaeffer and Bailet disclose fasteners that include split collars, wings, and resilient connections therebetween for manual separation of the collar to enable installation onto a threaded post or a post formed with longitudinally spaced detents or protrusions. Unfortunately, split collars that are designed to be manually separated may also be inadvertently separated upon application of certain external forces, and the fastener may loosen after being assembled together.

For example, if external forces are exerted on the collar sections in the direction toward the elastic connection and in such a way as to impart a torque on the collar section, the collar sections will tend to separate from one another and from the post. If such forces are sufficiently large, the collar sections may disengage from the post, and in the presence of reversing load conditions, the clip can "walk" rearwardly on the post. Such loading conditions can occur, for example, from high winds acting on a sign when the wind induces a resonant condition in the sign post.

The occurrence of this condition is precluded in Schaeffer and most of the embodiments of Bailet by providing the split collar with a nose section that is snugly received into a recess formed in the contacting member. In such arrangements, inadvertent separation is avoided because the external forces are directed inwardly through the nose of the collar toward the center of the post, rather than rearwardly toward the elastic bands. However, where it is desired to utilize such quick-assembly fasteners without the need to provide a recess sized for receiving the forward portion of the clip in the contacting member, such as disclosed in Anderson and certain embodiments shown in Bailet, there is a need for an improved fastener adapted to prevent inadvertent loosening of the clip from the post.

SUMMARY OF THE INVENTION

The general aim of the present invention is to provide a new and improved fastener of the above-described type in which the clip is uniquely adapted for improved resistance against the application of external twisting forces, and thus providing improved retention on the post, by reducing the available lateral movement of the collar sections relative to the post and relative to one another.

A detailed objective is to achieve the foregoing by providing the clip with material or tab portions that are positioned on the inside of the clip to restrict the lateral movement of the clip, but that do not interfere with installation and removal of the clip from the post.

The invention also reside in a novel lead-in portion at the free end of the post to aid in establishing initial axial alignment between the post and the clip prior to assembling the fastener together.

These and other objectives and advantages of the invention will become more apparent from the following detailed description when taken in conjunction with the accompanying drawings.

Briefly, the fastener of the present invention includes a post formed with a head and an elongated shank having a series of longitudinally spaced ribs, and a clip equipped with a split collar at one end connected to centrally located elastic bands for resilient movement of the collar between (1) a normally closed position adapted for locking engagement between adjacent ribs to secure the clip on the post, and (2) an open position providing clearance between the collar and the ribs to effect installation or removal of the clip from the post. Hand-operable wing members extending from the elastic bands enable manual movement of the collar from the closed position to the open position.

The clip also includes internal tabs adapted to reduce the available lateral movement of the clip. The tabs are formed on the inside diameter of the clip between the collar and the elastic bands, and are sized to substantially reduce the radial clearance between the post and the clip. The tabs contact the ribs to assist in preventing separation of the collar from the post in the event that the collar is exposed to external twisting forces that would otherwise tend to separate the collar sections.

BRIEF DESCRIPTION OF THE DRAWINGS

FIG. 4 is a view taken substantially along the line 4—4 of FIG. 2, with the collar sections being shown in cross-section and certain other portions of the clip shown in phantom lines.

FIG. 5 is a front view of the clip, the post being shown in cross-section.

FIG. 6 is a back view of the clip.

FIG. 7 is a back view of an alternate embodiment of the clip.

FIGS. 8A and 8B are side and back views, respectively of a prior art clip shown with a twisting force "A" acting on a connected member and being transferred to the clip.

FIG. 9 is an enlarged fragmentary cross-sectional view of the prior art clip of FIGS. 8A and 8B, the collar sections separating from the post as a result of the twisting force "A".

FIGS. 10 and 11 are orthogonal side views of the clip according to the present invention.

Figure 1:
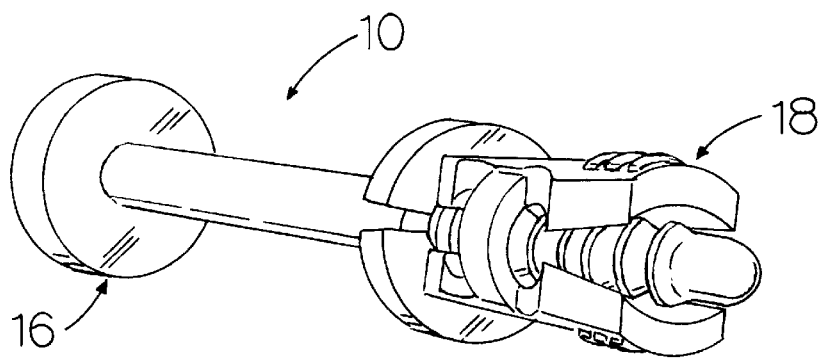
FIG. 1 is a rear perspective view of a new and improved fastener comprising a post and a clip and incorporating the unique aspects of the present invention.

While the invention is susceptible of various modifications and alternative constructions, certain illustrated embodiments have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

DETAILED DESCRIPTION OF THE INVENTION

For purposes of illustration, the present invention is shown in the drawings as embodied in a two-part fastener 10 having a male post member 16 and a female clip member 18 adapted to be releasably secured to the post 16 for securing two or more members together.

Figure 2:
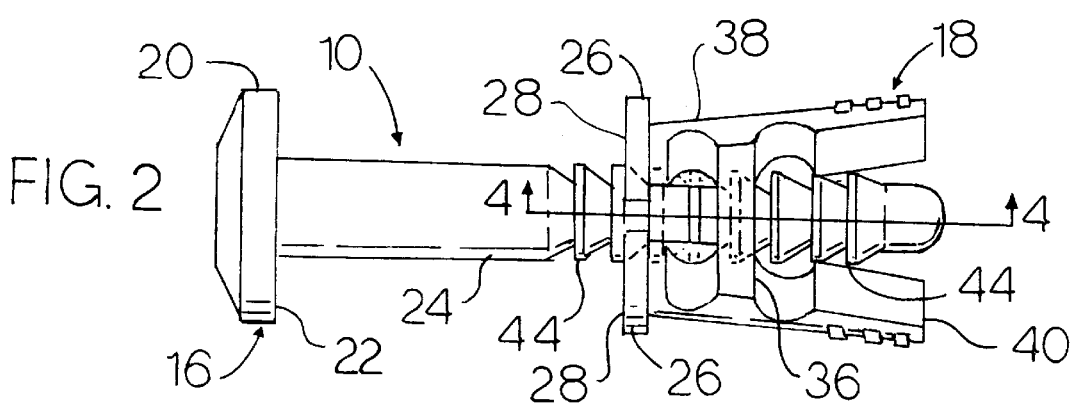
FIG. 2 is a side view of the fastener showing the clip in its normally closed position.

The fastener post 16 includes a head 20 having a contact face 22, and an elongated shank 24 formed with a series of radially extending, longitudinally spaced ribs 44. The ribs are preferably circular in cross-section, are formed with rear surface portions 46 (FIG. 12) that slope radially inwardly upon progressing rearwardly along the shank, and are formed with forwardly facing, radially extending shoulders 48 on the outer edge portions thereof. For description purposes herein, the head 20 is considered to be located at the front of the fastener, and the directional modifiers forwardly and rearwardly are intended to identify the directions toward the left and right, respectively, along the length of the fastener in the orientation shown in FIGS. 2 and 3.

Figure 3:
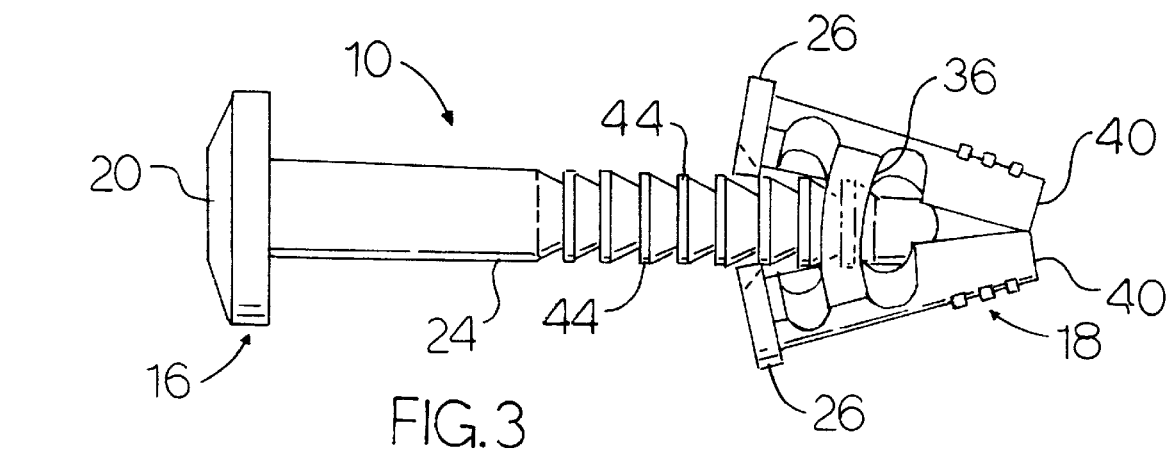
FIG. 3 is a view similar to FIG. 2 but showing the clip in its open position as it is being installed onto or removed from the post.

The clip 18 is formed with opposing collar sections 26 connected to elastic bands or strips 36 for resilient movement between a normally biased closed position providing for interlocking engagement with the ribs 44 of the fastener post 16 (see e.g. FIGS. 2 and 4), and an open or release position providing a clearance fit around the shank 24 for slipping the clip onto and off the post (see FIG. 3). Wing sections 40 extend rearwardly from center sections 38 and are aligned with the split collar sections such that squeezing the wings together causes the collar sections to resiliently pivot or separate outwardly about the center bands 36 to the open position. The wings normally slope radially outwardly upon progressing rearwardly from the center sections to provide the radial clearance between the shank and the collar sections when the wings are squeezed to a diameter slightly greater than the diameter of the shank. In the embodiment shown, the clip is integrally molded from a resilient elastic material such as Nylon to provide for inexpensive, yet corrosion resistant construction.

To effect engagement between the fastener post 16 and the clip 18, the center portions 34 (see (FIG. 4) of the collar sections 26 are sized to be received between adjacent ribs 44 when in the closed position, and are preferably formed with a profile that is complimentary to the profile of the ribs for locking the clip 18 into longitudinal engagement on the post 16 (see e.g., FIG. 4). In the embodiment shown, the center portion of each collar section is formed with a forward edge portion 50 (FIG. 12) that slopes radially inwardly upon progressing rearwardly, and a radially extending and rearwardly facing surface 52 for engaging a shoulder 48 of the ribs. To achieve preferred engagement between the post and the clip, the inside radius surfaces 34 of the collar sections are preferably formed with approximately the same radius as the root diameter 32 of the shank (see FIGS. 4 and 5). In addition, the clip is preferably configured so that the center portions 34 are biased by the elastic bands 36 to a position normally spaced apart by a distance slightly less than the root diameter 32, resulting in a snug fit between the portions 34 of the clip and the root diameter of the post when positioned thereon. Further, corner reliefs 60 are provided on the inner portions 34 to promote full engagement in the root diameter of the post.

With this arrangement, the fastener 10 may be assembled by squeezing the wings 40 together to open the collar sections 26, and then slipping the clip 18 onto the fastener post 16 to the desired position such as shown in FIG. 3. Releasing the wings allows the collar sections to resiliently close for locking engagement between adjacent ribs of the post. The fastener may be disassembled by again squeezing the wings to hold the collar sections open, thus disengaging the collar sections from the post, and then simply slipping the clip from the post.

In the embodiment shown, the complimentary inclined surfaces 50 and 46 of the clip 18 and ribs 44, respectively, permit the clip to be pushed toward the head into position on the post 16. In this instance, the connecting strips 36 bow outwardly as the collar sections 34 resiliently separate and snap over each successive rib as inclined surfaces 50 on the clip engage and slide outwardly along each successive complimentary inclined surface 46 on the post. As a result, two or more members can be fastened together by inserting the shank of the post 16 through aligned openings in such members, holding the contact surface 22 of the head 20 snugly against the adjacent member to the left of the head, and then pushing the clip onto the shank until the contact faces 28 are snugly positioned against the right member, after which the bands 36 resiliently return the collar sections to the closed position for engagement between the two adjacent ribs closest to and rearwardly thereof. It will become apparent, however, that the present invention is equally suitable and easily adapted for use with ribs of alternate configurations including common threaded rods, and for rods formed with other longitudinally spaced protrusions or recesses formed in the post.

It has been found that clips of the type disclosed in Anderson, U.S. Pat. No. 5,775,863, and other prior clips of this general type, may separate when the members secured together with such fasteners are exposed to relatively high twisting forces, and particularly when the twisting forces rapidly reverse direction. Such forces can result from a variety of external sources such as when wind acting on a sign secured to a sign post induces a resonant condition in the post.

For the purpose of discussing this condition, a prior art clip 18P is shown in FIGS. 8A, 8B and 9. In this instance, if a torque or twisting force "A" is applied to the sign 12 and collar section 26P of the prior art clip such as in a clockwise direction, the clip tends to pivots clockwise about the contact junction between the center collar portions and the corresponding surfaces of the ribs until the inside diameter surface 41P of the upper wing 40P contacts the upper edges of the ribs 44 as shown in FIGS. 8A and 8B. As the intensity of the twisting force continues to increase, (1) the contact pivot points between the clip and the fastener post shift to (a) the engaging surfaces between the lower collar section and the lower rib surface and (b) the rear portion of the upper wing 40P engaging an outer upper surface portion of the fastener post, and (2) the upper collar section begins to pivot upwardly and may be lifted from engagement with rib 44P as shown in FIG. 9, after which (3) the collar section may be driven rearwardly past the edge 52P of the rib if the twisting force is sufficient. If the direction of the twisting force reverses, the upper collar section will return to engagement with the post, but this time it may fall into rearward engagement with the rib 44P (FIG. 9) rearwardly of the previously engaged rib 44P, and the lower collar section (not shown in FIG. 9) can be lowered from engagement with the rib 44P in the same manner. In the presence of such relatively high, reversing forces, the collar sections can "walk" rearwardly on the post, disengaging from one rib and re-engaging with the rib rearwardly thereof, one rib after another, resulting in loosening of the members connected by the fastener.

In accordance with the present invention, the clip 18 is provided with uniquely configured tab structure that restricts twisting and lateral movement of the clip or collar sections 26 relative to the post and relative to each other, but that does not restrict the bending or pivoting action of the collar sections during normal installation and removal of the clip from the post. As a result, the clip is better able to withstand repeated application of relatively high twisting forces, and maintain its position on the post.

In carrying out the invention, the clip 18 shown is formed with tabs that are adapted to generally surround the post to limit radial clearance, and that are located between the elastic pivot sections 36 and the trailing edge surfaces 52 of the collar sections 26.

Figure 12:
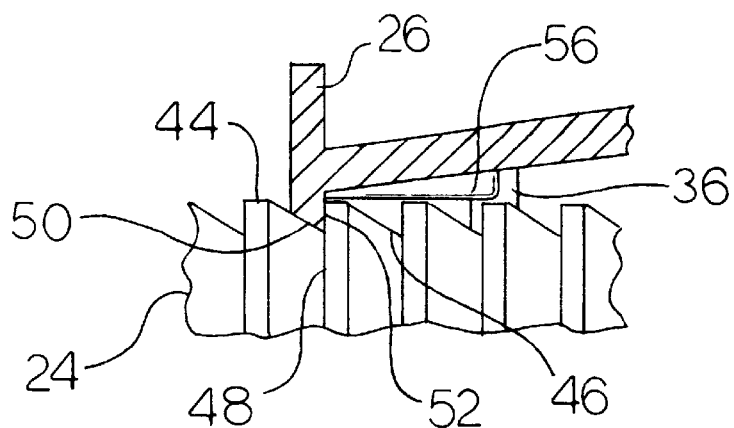
FIGS. 12 and 13 are enlarged fragmentary cross-sectional showing detailed relationship between the post and the clip in the positions shown in FIGS. 2 and 3, respectively.
Figure 13:
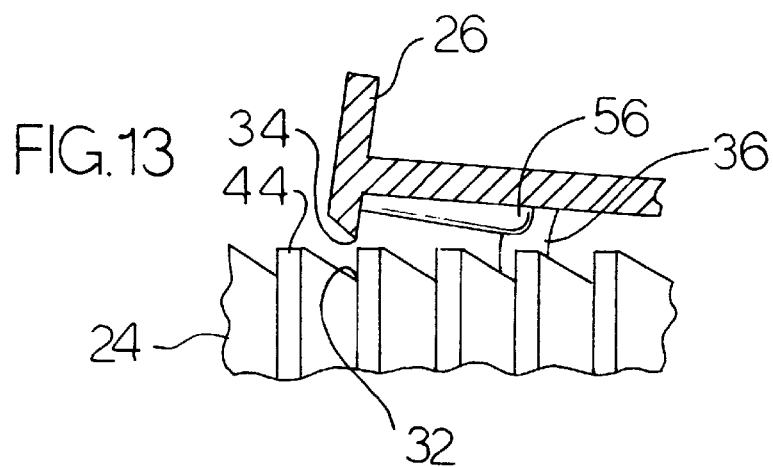

In the embodiment shown most clearly in FIGS. 6 and 12, the clip 18 is formed with four tabs 56 that (1) are approximately equally angularly spaced on the inside of the center sections 38, (2) extend from the back face 52 of the collar sections 26 to approximately the center of the elastic pivot bands 36, and (3) are sized for a relatively close radial clearance around the outer diameter of the ribs 44 when positioned on the post 16 (see FIG. 12). The small radial clearance substantially restricts lateral movement of the collar sections, both relative to the post and to each other, and thus aids in preventing the collar sections from separating as a result of twisting forces applied to the collar sections. And since the tabs are at or forwardly of the center pivot location coincident with the elastic bands 36, the tabs swing outwardly from the post with the collar sections and center sections 38 when the wings 40 are squeezed together for normal assembly and disassembly of the fastener.

Figure 14:
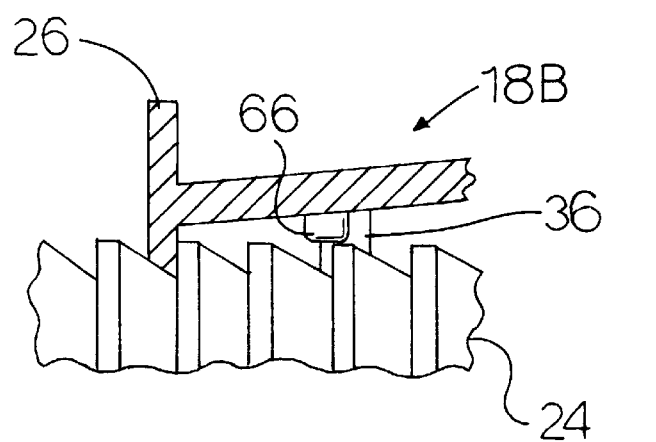
FIGS. 14 and 16 are enlarged cross-sectional views similar to FIG. 12 of alternate clip embodiments.
Figure 15:
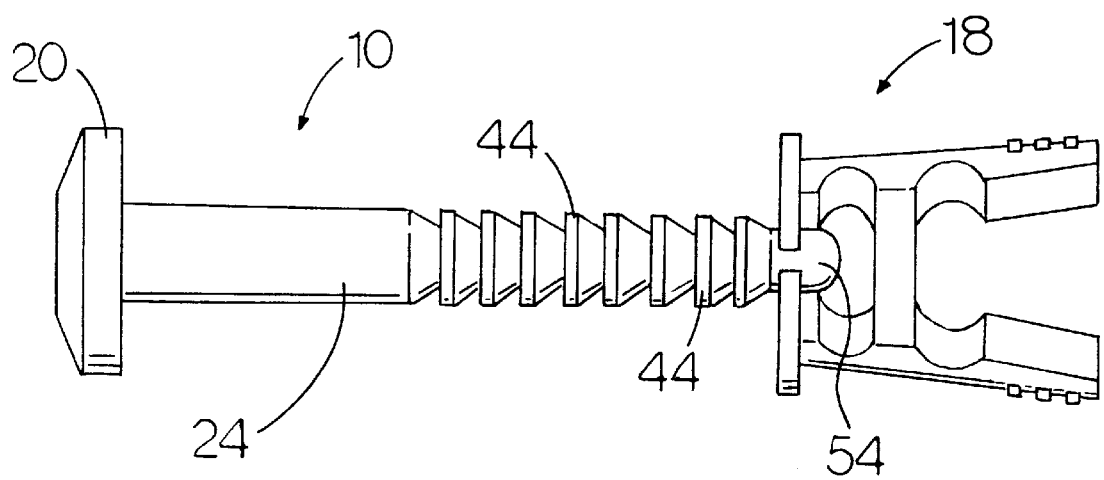
FIG. 15 is a side view of the fastener showing the clip positioned on a lead-in portion of the post pursuant to the present invention.
Figure 16:
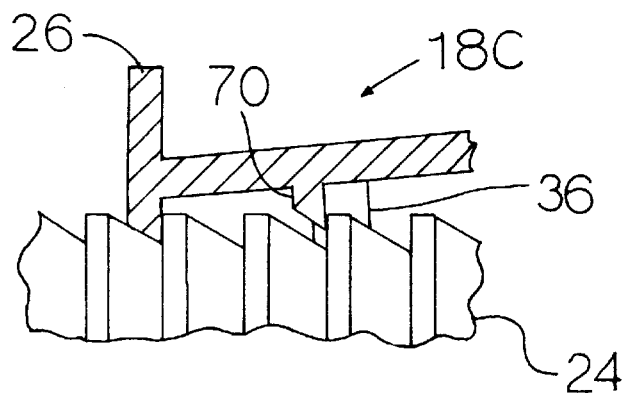

In an alternate embodiment shown in FIG. 7, the clip 18A is formed with two tabs 64, one tab being associated with each of the collar sections 26. The tabs 64 are formed with a cross-section similar to tabs 56 (as seen in FIG. 12), with the space between the tabs 56 being filled to define tabs 64. In still another alternate embodiment, tabs 66 (FIG. 14) of clip 18B are formed with radial cross-sectional shapes such as either tabs 56 or tabs 64 as viewed in FIGS. 6 and 7, respectively, but are spaced from the collar sections 26. In yet another alternate embodiment, tabs 70 (FIG. 16) are formed to also function as a second set of collar sections located at approximately the center of the elastic bands 36 to provide additional rearward locking engagement on the post. These and other embodiments may be utilized to aid in maintaining concentric alignment between the post and the clip, and reduce the lateral clearance, without interfering with normal collar separation discussed above.

With the relatively close radial clearance established between the ribs 44 and the tabs according to the present invention, initial axial alignment between the clip 18 and the post 16 will aid the user in installing the clip, particularly if the clip is to be pressed onto the post without manually separating the collar sections. To assist the user with such initial alignment, the free end portion of the post 16 includes a lead-in portion 54 that is preferably formed at the same diameter as the root diameter 32 of the post. With this arrangement, the clip may be quickly and easily positioned on the free end of the post and into axial alignment therewith, and, by virtue of the snug fit with the collar sections at the root diameter 32 as discussed above, the clip will remain on the lead-in portion until the fastener is pressed together. Because the free end portion 54 is preferably formed at approximately the root diameter 32, as opposed to a larger diameter such as the outer diameter of the ribs 44, only relatively small forces are needed for the initial positioning of the clip onto the post.

From the foregoing, it is apparent that the present invention brings to the art a new and improved fastener 10 provided with uniquely positioned and configured internal tabs such as 56, 64, and 66 that substantially reduce the freedom of lateral or radial movement between the clip 18 and the post 16 and the relative movement between the two halves of the split collar to reduce separation of the clip as a result of external forces applied to the clip. As a result, the fastener 10 is provided with improved engagement between the clip 18 and the post 16, and is better able to withstand repeated application of forces without loosening of the clip on the post as compared with prior fasteners of the same general type.

I claim:

1. A fastener comprising:
    a post having a center axis and having first and second longitudinally spaced and generally forwardly facing shoulders;
    a clip having
        split collar sections;
        means for connecting said collar sections for movement toward and away from said axis between first and second positions, respectively;
        said collar sections being sized for
            rearward locking engagement with said first shoulder when in one of said positions, and
            radial clearing relation with said shoulders when in the other of said positions; and
        tab portions connected for movement toward and away from said axis with said collar sections;
        said tab portions being axially aligned with and in radial clearing relation with said second shoulder when said collar sections are in locking engagement with said first shoulder.

2. A fastener as defined in claim 1 in which said tab portions are disposed between said collar sections and said connecting means.

3. A fastener as defined in claim 2 in which said tab portions extend substantially between said collar sections and said connecting means.

4. A fastener as defined in claim 1 in which said connecting means connects said collar sections for pivotal movement between said positions.

5. A fastener as defined in claim 1 in which said collar sections and said tab portions are positioned radially outwardly of said shoulders.

6. A fastener as defined in claim 1 further comprising split lever means connected to said collar sections for effecting movement of said collar sections between said positions.

7. A fastener as defined in claim 1 in which said collar sections are resiliently biased toward said one position and are adapted to snap past said first shoulder and into said engagement with said second shoulder when said clip is pushed forwardly into engagement on said post.

8. A fastener as defined in claim 7 in which said second shoulder is formed with a generally rearwardly facing chamfer portion and said collar sections are formed with complimentary and generally forwardly facing chamfer portions, said chamfer portions slidably engaging to cause said collar sections to move toward said other position as said clip is pushed forwardly into engagement on said post.

9. A fastener as defined in claim 7 in which said post is formed with a free end portion having a constant diameter to provide for initial alignment between the clip and the post prior to pushing the clip into engagement with the shoulder.

10. A fastener comprising:
   a post having a plurality of longitudinally spaced and generally radially extending ribs; and
   a clip having
      substantially opposing collar sections formed with generally rearwardly facing surfaces;
      means for connecting said collar sections for movement between a first position in which said surfaces are in rearward locking engagement with one of said ribs and a second position in which said collar sections are in radial clearing relation with said ribs, said connecting means including radially facing surface portions extending rearwardly from said surfaces and located at a minimum radial distance from said ribs;
      substantially opposing lever means operatively connected to said collar sections for effecting movement of said collar sections to said second position for installation and removal of the clip from the post, and
      angularly spaced tab portions disposed between said collar sections and said connecting means and sized for radial clearing relation with said ribs, said tab portions having radially facing surface portions spaced rearwardly from said collar sections and located at a minimum radial distance from said ribs that is not greater than said minimum radial distance of said first surface portions.

11. A fastener as defined in claim 10 in which said connecting means includes a forward portion extending rearwardly from said collar sections and a rear portion, and said tab portions extend substantially between said collar sections and the rear portion of said connecting means.

12. A fastener as defined in claim 10 in which said tab portions are positioned radially outwardly of said ribs.

13. A fastener as defined in claim 10 in which said collar sections are resiliently biased toward said first position and are adapted to snap past successive ones of said ribs when said clip is pushed forwardly into engagement on said post.

14. A fastener as defined in claim 13 in which said ribs are formed with generally rearwardly facing chamfer portions and said collar sections are formed with complimentary and generally forwardly facing chamfer portions, said chamfer portions slidably engaging to cause said collar sections to move toward said second position as said clip is pushed forwardly into engagement on said post.

15. A fastener as defined in claim 13 in which said post is formed with a free end portion having a constant diameter to provide for initial alignment between the clip and the post prior to pushing the clip into engagement on the post.

16. A fastener comprising:
   a post having a plurality of longitudinally spaced and radially extending rib portions formed with generally forwardly facing shoulders; and
   a clip having
      substantially opposing collar sections formed with generally rearwardly facing surfaces;
      means for connecting said collar sections for movement between a first position in which said surfaces are in rearward locking engagement with one of said shoulders and a second position in which said collar sections are in radial clearing relation with said ribs;
      said collar sections being resiliently biased to said first position and being adapted to snap past successive shoulders as the clip is pushed forwardly onto the post;
      substantially opposing lever means operatively connected to and extending rearwardly from said collar sections for effecting movement of said collar sections to said second position for installation and removal of the clip from the post; and
      substantially opposing material portions disposed between said collar sections and said connecting means for movement with said collar sections, said material portions being in radial clearing relation with said ribs and positioned to engage the post upon application of a twisting force on the clip so as to restrict lateral and twisting movement of the clip prior to and to generally prevent lateral engagement between said lever means with said ribs.

17. A fastener as defined in claim 16 in which said post is formed with a free end portion having a constant diameter sized for snugly receiving the clip to provide for initial alignment prior to pushing the clip into engagement with said ribs.

18. A fastener as defined in claim 16 in which said clip includes a second set of substantially opposing collar sections formed with said material portions.

* * * * *